United States Patent
Sundström et al.

(10) Patent No.: US 12,097,453 B2
(45) Date of Patent: Sep. 24, 2024

(54) METHOD AND SYSTEM FOR CIRCULAR USE OF INDUSTRIAL OIL

(71) Applicant: SKF RECONDOIL AB, Östersund (SE)

(72) Inventors: Fred Sundström, Stockholm (SE); Tomas Östberg, Fröson (SE); Thomas Persson, Sandviken (SE)

(73) Assignee: SKF RECONDOIL AB, Stockholm (SE)

( * ) Notice: Subject to any disclaimer, the term of this patent is extended or adjusted under 35 U.S.C. 154(b) by 431 days.

(21) Appl. No.: 17/428,688

(22) PCT Filed: Mar. 2, 2020

(86) PCT No.: PCT/SE2020/050096
§ 371 (c)(1),
(2) Date: Aug. 5, 2021

(87) PCT Pub. No.: WO2020/162816
PCT Pub. Date: Aug. 13, 2020

(65) Prior Publication Data
US 2022/0111317 A1    Apr. 14, 2022

(30) Foreign Application Priority Data
Feb. 8, 2019   (SE) .................................. 1950147-7

(51) Int. Cl.
*B01D 37/03*   (2006.01)
*B01D 21/01*   (2006.01)
(Continued)

(52) U.S. Cl.
CPC .............. *B01D 37/03* (2013.01); *B01D 21/01* (2013.01); *B01D 21/262* (2013.01); *B01D 35/005* (2013.01); *F16N 99/00* (2013.01)

(58) Field of Classification Search
CPC ........ C10M 175/0016; C10M 175/005; C10M 175/0058; C10M 175/0091;
(Continued)

(56) References Cited

U.S. PATENT DOCUMENTS

| 1,951,739 A | 3/1934 | Rodman et al. |
| 2,023,988 A | 12/1935 | Bissell et al. |

(Continued)

FOREIGN PATENT DOCUMENTS

| CA | 2747909 C | 6/2014 |
| CN | 85100831 A | 7/1986 |

(Continued)

OTHER PUBLICATIONS

Communication dispatched Jul. 21, 2022 in related European application No. 20 706 024.5 and examined claims 1-16.
(Continued)

*Primary Examiner* — Dirk R Bass
(74) *Attorney, Agent, or Firm* — J-TEK LAW PLLC; Jeffrey D. Tekanic; Scott T. Wakeman (57) ABSTRACT

In a method for reconditioning an industrial oil and in an oil recovery system therefor, a used industrial oil is reconditioned by adding a liquid separation booster to the used industrial oil, and then the separation booster with attracted impurities is separated from the used industrial oil while leaving at least one specific additive in the oil. The separation booster is designed to attract impurities in the used oil while not attracting at least one specific additive in the oil.

33 Claims, 4 Drawing Sheets

(51) Int. Cl.
  *B01D 21/26* (2006.01)
  *B01D 35/00* (2006.01)
  *F16N 99/00* (2006.01)

(58) Field of Classification Search
  CPC ....... C10M 2203/1006; B01D 17/0202; B01D 17/042; B01D 17/047; B01D 21/01; B01D 21/262; B01D 2201/182; B01D 2239/0407; B01D 35/005; B01D 37/02; B01D 37/03; B01D 37/04; B01D 39/18; C10N 2040/08; C10N 2070/00; F16N 99/00
  See application file for complete search history.

(56) References Cited

U.S. PATENT DOCUMENTS

| | | |
|---|---|---|
| 2,049,014 A | 7/1936 | Mcafee et al. |
| 2,248,131 A | 7/1941 | Smith |
| 2,435,707 A | 2/1948 | Bray et al. |
| 3,265,212 A | 8/1966 | Bonsall |
| 3,304,255 A | 2/1967 | Kihei et al. |
| 3,930,988 A | 1/1976 | Johnson |
| 4,028,226 A | 6/1977 | Forsberg |
| 4,226,714 A | 10/1980 | Furness et al. |
| 4,256,578 A | 3/1981 | Kozar |
| 4,741,840 A | 5/1988 | Atherton et al. |
| 4,812,234 A | 3/1989 | Perchthaler et al. |
| 4,948,393 A | 8/1990 | Hodson et al. |
| 4,990,237 A | 2/1991 | Heuer et al. |
| 5,053,082 A | 10/1991 | Flanigan et al. |
| 5,137,654 A | 8/1992 | Burke |
| 5,154,828 A | 10/1992 | Schneider et al. |
| 5,269,906 A | 12/1993 | Reynolds et al. |
| 5,587,065 A | 12/1996 | Burns |
| 5,948,242 A | 9/1999 | Ohsol et al. |
| 5,948,271 A | 9/1999 | Wardwell et al. |
| 5,976,357 A | 11/1999 | Stroem et al. |
| 6,013,174 A | 1/2000 | Kovacs |
| 6,074,549 A | 6/2000 | Cochrane et al. |
| 6,132,630 A | 10/2000 | Briant et al. |
| 6,191,077 B1 | 2/2001 | Baumgartner et al. |
| 6,379,549 B1 | 4/2002 | LePoder et al. |
| 6,527,960 B1 | 3/2003 | Bacon et al. |
| 6,555,014 B1 | 4/2003 | Bremer et al. |
| 7,517,458 B2 | 4/2009 | Owen |
| 8,816,105 B2 | 8/2014 | Ristolainen et al. |
| 10,493,383 B2 | 12/2019 | Teodorescu |
| 10,995,279 B2 | 5/2021 | Sundström et al. |
| 11,130,075 B2 | 9/2021 | Sundström et al. |
| 11,247,147 B2 | 2/2022 | Sundström et al. |
| 11,458,420 B2 | 10/2022 | Sundstroem et al. |
| 11,752,452 B2 | 9/2023 | Sundstroem et al. |
| 2003/0000895 A1 | 1/2003 | Hensley et al. |
| 2006/0000787 A1 | 1/2006 | Galasso et al. |
| 2006/0283807 A1 | 12/2006 | Owen |
| 2007/0241030 A1 | 10/2007 | Strom |
| 2008/0314821 A1 | 12/2008 | Ohashi et al. |
| 2009/0078632 A1 | 3/2009 | Gallo et al. |
| 2011/0174695 A1 | 7/2011 | Goldman |
| 2011/0213169 A1 | 9/2011 | Ristolainen et al. |
| 2013/0098805 A1 | 4/2013 | Bjornson et al. |
| 2014/0224640 A1 | 8/2014 | Fincher et al. |
| 2014/0332473 A1 | 11/2014 | Haberman et al. |
| 2015/0072850 A1 | 3/2015 | Derrick et al. |
| 2015/0152340 A1 | 6/2015 | Cherney et al. |
| 2015/0224431 A1 | 8/2015 | Wase |
| 2015/0265955 A1 | 9/2015 | Kanchi et al. |
| 2015/0283487 A1 | 10/2015 | Demmel et al. |
| 2015/0322348 A1 | 11/2015 | Dasgupta |
| 2016/0052799 A1 | 2/2016 | Grave et al. |
| 2016/0122209 A1 | 5/2016 | Newman, Jr. |
| 2016/0177198 A1 | 6/2016 | Mao |
| 2016/0264442 A1 | 9/2016 | Knoop |
| 2017/0029716 A1 | 2/2017 | Dasgupta |
| 2017/0190985 A1 | 7/2017 | Matza |
| 2019/0192996 A1 | 6/2019 | Persson |
| 2020/0056102 A1 | 2/2020 | Sundström et al. |
| 2020/0061498 A1 | 2/2020 | Sundström et al. |
| 2020/0230520 A1 | 7/2020 | Sundström et al. |
| 2021/0101094 A1 | 4/2021 | Sundström et al. |
| 2022/0016554 A1 | 1/2022 | Persson et al. |
| 2022/0096976 A1 | 3/2022 | Mineo et al. |
| 2022/0410038 A1 | 12/2022 | Sundstroem et al. |
| 2023/0143845 A1 | 5/2023 | Enquist et al. |
| 2023/0182050 A1 | 6/2023 | Oestberg et al. |

FOREIGN PATENT DOCUMENTS

| | | |
|---|---|---|
| CN | 102925275 A | 2/2013 |
| CN | 104662139 A | 5/2015 |
| CN | 105457606 A | 4/2016 |
| CN | 205133522 U | 4/2016 |
| CN | 107158744 A | 9/2017 |
| DE | 19522596 A1 | 1/1997 |
| DE | 102009006586 A1 | 6/2010 |
| DE | 102012219409 A1 | 4/2014 |
| EP | 0693544 A3 | 5/1996 |
| EP | 1561797 A1 | 8/2005 |
| EP | 2181744 A1 | 5/2010 |
| EP | 2900798 B1 | 11/2017 |
| ES | 2374247 A1 | 2/2012 |
| FI | 20105121 A | 8/2011 |
| GB | 500433 A | 2/1939 |
| GB | 547020 A | 8/1942 |
| GB | 758747 A | 10/1956 |
| GB | 1041703 A | 9/1966 |
| GB | 1294861 A | 11/1972 |
| GB | 1450673 A | 9/1976 |
| GB | 2107347 A | 4/1983 |
| GB | 2334034 A | 8/1999 |
| JP | S60135483 A | 7/1985 |
| JP | S6351903 U | 4/1988 |
| JP | 2001239111 A | 9/2001 |
| JP | 2016161464 A | 9/2016 |
| WO | 9840148 A1 | 9/1998 |
| WO | 2005111181 A1 | 11/2005 |
| WO | 2014049060 A1 | 4/2014 |
| WO | 2016095009 A1 | 6/2016 |
| WO | 2017196234 A1 | 11/2017 |
| WO | 2018074966 A1 | 4/2018 |
| WO | 2018199837 A1 | 11/2018 |
| WO | 2018199838 A1 | 11/2018 |
| WO | 2018199839 A1 | 11/2018 |
| WO | 2020162815 A1 | 8/2020 |
| WO | 2021233759 A1 | 11/2021 |
| WO | 2021245121 A1 | 12/2021 |
| WO | 2022253590 A1 | 12/2022 |
| WO | 2023274513 A1 | 1/2023 |

OTHER PUBLICATIONS

Communication dispatched Jul. 25, 2022 in related European application No. 20706852.
Office Action and Search Report from the Chilean Patent Office dispatched Aug. 18, 2022 in related Chilean application No. CL 202102034.
Office Action and Search Report from the Chilean Patent Office dispatched Aug. 18, 2022 in related Chilean application No. CL 202102033.
Office Action and Search Report from the Chinese Patent Office dispatched Jul. 29, 2022, in related Chinese application No. 202080012840.3, and translation thereof.
Office Action and Search Report from the Chinese Patent Office dispatched Jul. 25, 2022, in related Chinese application No. 202080013038.6, and translation thereof.
Human prepared translation of Office Action dispatched Jul. 25, 2022, in related CN application No. 202080013038.6.
Chemistry and Technology of Oils, China Light Industry Press, Jun. 30, 2001, pp. 664-665, with translation.
Office Action mailed Jun. 27, 2023, in related U.S. Appl. No. 17/428,728, and examined claims 1-20.

(56) References Cited

OTHER PUBLICATIONS

Unpublished U.S. Appl. No. 18/633,993, filed Apr. 12, 2024; first named inventor: Thomas Persson.

Handbook of Thermal Engineering vol. 4 Power Plant Chemistry, Xi'an Institute of Thermal Engineering, Ministry of Energy, Water Conservancy and Electric Power Press (1993) p. 615, and English translation thereof.

Notice of Allowance mailed Nov. 8, 2023, in related U.S. Appl. No. 17/428,728, and allowed claims 1-20.

Office Action from the Chinese Patent Office dispatched Feb. 17, 2023, in related Chinese application No. 202080013038.6, and translation thereof.

Office Action from the Chinese Patent Office dispatched Jul. 12, 2023, in related Chinese application No. 202080012840.3, and translation thereof.

Office Action from the Chinese Patent Office dispatched Jul. 14, 2023, in related Chinese application No. 202080013038.6, and translation thereof.

Regeneration of Waste Lubricating Oil, Information Office of the Comprehensive Research Institute of the Academy of Petrochemical Sciences, Fuel Chemical Industry Publishing House (1974), p. 74, and English translation thereof.

Waste Oil Recycling Process, edited by Li Jiwu et al., China Railway Publishing House (1984) pp. 153-154, and English translation thereof.

Communication dispatched Aug. 8, 2023, in related European patent application No. 20 706 024.5, including Opinion and examined claim 1-13.

Unpublished U.S. Appl. No. 17/428,728.

Office Action from the Chinese Patent Office dispatched Feb. 24, 2023 in related Chinese application No. 202080012840.3, and translation thereof.

Toshio Sakurai, "Petroleum Product Additives", pp. 432-433, Petroleum Industry Press (Nov. 1980), and translation thereof prepared by the Petroleum Product Additives Translation Group.

International Search Report and Written Opinion for parent application No. PCT/SE2020/050096.

Office Action and Search Report from the Swedish Patent Office dated Aug. 1, 2019 in related Swedish application No. 1950146-9.

METHOD AND SYSTEM FOR CIRCULAR USE OF INDUSTRIAL OIL

CROSS-REFERENCE

This application is the U.S. National Stage of International Application No. PCT/SE2020/050096 filed on Feb. 3, 2020, which claims priority to Swedish patent application no. 1950147-7 filed on Feb. 8, 2019.

TECHNICAL FIELD OF THE INVENTION

The present invention generally relates to a method for a circular use (purification) of industrial oil and to an oil recovery (purification) system.

BACKGROUND

Purification of contaminated oil, such as for example industrial oils, is important to enable such oils to be re-used and therefore is an important factor for the environmental future and for conserving the limited natural resources of oils. The contaminated oil can be purified, or recovered, using a liquid two-phase separation process, wherein a liquid separation aid is added to the oil and mixed therewith. Impurities will be captured by the separation aid and can for example accumulate in a bottom phase.

There is still a need to improve techniques for reusing (purifying) industrial oils.

SUMMARY

It is an object of the present teachings to disclose techniques for improving methods and systems for reusing (purifying) industrial oils.

According to one aspect of the present teachings, a method for a circular use (purification) of industrial oil may comprise reconditioning a used industrial oil by:
  adding a liquid separation booster to the used industrial oil, wherein said separation booster is designed to attract impurities in the used oil and to be passive with respect to, i.e. not attract, at least one specific (functional) additive in the used oil;
  separating out the separation booster with attracted impurities from the used industrial oil while leaving the at least one specific additive in the oil.

According to another aspect of the present teachings an oil recovery system may comprise:
  at least one oil purification tank into which used industrial oil is provided for purification;
  a booster adding device connected to the oil purification tank and configured for adding a liquid separation booster to the used oil in the purification tank, wherein said separation booster is designed to attract impurities in the used oil and to be passive with respect to, i.e. not attract, at least one specific (functional) additive in the oil; and
  a separation device configured for separating out the separation booster with attracted impurities from the used industrial oil while leaving the at least one specific additive in the (purified) oil.

Hereby, in a method and a system for a circular use (purification) of industrial oil, impurities in a used industrial oil can be removed without the risk of also (undesirably) removing functional additives (e.g., the at least one specific additive) from the oil. A liquid separation booster is used which is specifically designed such that it will attract impurities but not additives, such as the at least one specific additive. An effective reconditioning (purification) of the used industrial oil is achieved thereby.

In some embodiments of the present teachings, the method may further comprise adding one more (functional) additives to the used oil, e.g., replenishing the used oil with the at least one specific additive. The oil recovery system may comprise an additive providing device configured for adding additives, such as the at least one specific additive, to the used oil. Hereby additives, such as the at least one specific additive, which have been depleted during use of the industrial oil can be added and the industrial oil can be used (re-used) and circulated even longer.

The method may further comprise analyzing the used oil to identify an amount of depletion of certain additives, such as the at least one specific additive, in the used oil (i.e. determining whether the amount of the at least one specific additive in the used oil has decreased below a predetermined amount) before the step of adding one or more (functional) additives, such as the at least one specific additive, to the used oil, wherein the step of adding (replenishing) additives, such as the at least one specific additive, to the used oil comprises adding the (functional) additive(s), such as the at least one specific additive, which has/have been identified as having been depleted and in an amount corresponding to the identified (determined) amount of depletion. That is, an amount of the at least one specific (functional) additive is added to the used oil such that the amount (concentration) of the at least one specific additive in the used oil becomes a predetermined amount (concentration). The oil recovery system may comprise at least one analyzing device which is configured for analyzing the used oil to identify depletion of certain (functional) additives, such as the at least one specific additive, in the used oil before adding (functional) additives, such as the at least one specific additive, to the used oil, wherein the additive providing device is configured for adding the (functional) additive(s), such as the at least one specific additive, which has/have been identified as having been depleted and in an amount corresponding to the identified amount of depletion. Hereby the reconditioning of the used industrial oil can be even more effective and the industrial oil can be used (re-used) effectively for a longer time.

In one embodiment of the present teachings, the liquid separation booster may be at least substantially insoluble in the oil, forming a two phase mixture upon mixing, and wherein the separation booster attracts impurities in the oil during mixing of the oil and the separation booster and wherein the separation booster has a sufficiently big difference in polarity compared to the polarity of the at least one specific (functional) additive in the industrial oil such that the at least one specific additive is not soluble in the separation booster. Hereby the separation booster will be passive with respect to, i.e. not attract, the at least one specific additive, whereby the separation booster with attracted impurities can be separated from the oil without also removing at least this specific additive. The separation booster is suitably passive with respect to more than one specific additive.

In another embodiment of the present teachings, separating the separation booster with attracted impurities from the used industrial oil may comprise one or more of the following steps: mixing the used oil with the separation booster, warming the mixture, waiting for the separation booster with attracted impurities to settle (separate) in a top or bottom phase in the oil purification tank, centrifuging the mixture of used oil and separation booster, filtering the mixture of used oil and separation booster and/or filtering an oil phase after separation booster with attracted impurities has settled (separated) to a top or bottom phase. The separation device may comprise one or more of the following: a mixing device for mixing the used oil with the separation booster, a heating device for warming the mixture, a centrifuging device configured for centrifuging the mixture of used oil and separation booster and/or a filtering device configured for filtering the mixture of used oil and separation booster or for filtering an oil phase after separation booster with attracted impurities has settled to a top or bottom phase.

In another embodiment of the present teachings, the method may further comprise:
designing an industrial oil specifically to be suitable to be purified with a dedicated separation booster, which separation booster is at least substantially insoluble in the oil, forming a two phase mixture upon mixing, said separation booster attracting impurities in the oil during mixing of the oil and the separation booster, wherein said designing of an industrial oil comprises providing a mixture of base oils and adding one or more functional additives, such as the at least one specific additive, to the mixture of base oils, wherein said base oils and additive(s) are chosen to have a sufficiently big difference in polarity compared to the polarity of the separation booster such that the base oils and additive(s) are not soluble in the separation booster,
using said specifically designed industrial oil before the used oil is reconditioned as described above by using the dedicated separation booster.

The oil recovery system may comprise at least one oil preparation tank configured for designing an industrial oil specifically designed to be suitable to be purified with a dedicated separation booster, which separation booster is at least substantially insoluble in the oil, forming a two phase mixture upon mixing, said separation booster attracting impurities in the oil during mixing of oil and separation booster, wherein said designing of an industrial oil comprises providing a mixture of base oils and adding one or more functional additives, such as the at least one specific additive, to the mixture of base oils, wherein said base oils and additive(s) are chosen to have a sufficiently big difference in polarity compared to the polarity of the separation booster such that the base oils and additive(s) are not soluble in the separation booster.

Thus, by specifically designing an industrial oil to be suitable to be purified with this liquid separation booster, the reconditioning of the industrial oil and the circular (further) use of the reconditioned (purified) industrial oil can be improved even more. By choosing base oils and (functional) additives in accordance with the separation booster to be used, i.e. base oils and additives which are not soluble in the separation booster, an effective reconditioning can be performed by using this specific separation booster, and the industrial oil can be effectively used over and over again.

In another embodiment of the present teachings, reconditioning the used oil may be performed inline in a system which is using the industrial oil, such that the reconditioning is performed in a closed circuit circulation system of the industrial oil. The oil recovery system may be designed as an inline system, so that the oil recovery system is integrable in a closed circuit circulation system of the industrial oil.

In another embodiment of the present teachings, the method may be performed offline and the method may further comprise retrieving used industrial oil from an industrial plant, reconditioning the used industrial oil and returning the reconditioned oil to an industrial plant for further use and possibly a first optional step of delivering a specifically designed industrial oil to an industrial plant. The oil recovery system may be provided as an offline system in which industrial oil from different industries can be reconditioned.

In another embodiment of the present teachings, the method may further comprise:
designing an industrial oil for use in a specific system or in a specific type of system, wherein said industrial oil is designed to be suitable to be purified with a dedicated separation booster, which separation booster is substantially insoluble in the oil, forming a two phase mixture upon mixing, said separation booster attracting impurities in the oil during mixing of oil and separation booster, wherein said designing of an industrial oil may comprise providing a mixture of base oils and adding one or more functional additives, such as the at least one specific additive, to the mixture of base oils to meet required technical specifications for use in the specific system or type of system, wherein said base oils and additive(s) are chosen to have a sufficiently big difference in polarity compared to the polarity of the separation booster such that the base oils and additive(s) are not soluble in the separation booster;
using the designed oil in the specific system or the specific type of system;
removing the designed oil from the system after use for a specific time;
purifying the removed used oil with the dedicated separation booster;
analyzing the removed used oil to identify an amount of depletion of certain additives, such as the at least one specific additive, in the oil;
adding to the removed used oil the additive(s), such as the at least one specific additive, which has/have been identified as having been depleted during the use and in an amount corresponding to the identified amount of depletion; and returning purified oil which also has been topped up with the additive(s) for further use in the specific system or specific type of system it initially was designed for.

In another embodiment of the present teachings the oil recovery system may comprise:
at least one oil preparation tank configured for designing an industrial oil for use in a specific system or in a specific type of system and to be suitable to be purified with a dedicated separation booster, which separation booster is substantially insoluble in the oil, forming a two phase mixture upon mixing, said separation booster attracting impurities in the oil during mixing of oil and separation booster, wherein said designing of an industrial oil may comprise providing a mixture of base oils and adding one or more functional additives, such as the at least one specific additive, to the mixture of base oils to meet required technical specifications for use in the specific system or type of system, wherein said base oils and additive(s) are chosen to have a sufficiently big difference in polarity compared to the polarity of the separation booster such that the base oils and additive(s) are not soluble in the separation booster;
at least one oil component tank connectable to at least one of said at least one oil preparation tank, wherein said at least one oil component tank comprises one or more base oil tanks;
an additive providing device connected to said at least one oil preparation tank, wherein said additive providing device is configured for providing the one or more functional additives, such as the at least one specific additive, which are chosen to meet required technical specifications for use in the specific system or type of system;

at least one used oil tank which is configured for holding used industrial oil which has been returned to the oil recovery system after use in the specific system or specific type of system;

at least one oil purification tank connectable to the at least one used oil tank, wherein said purification tank is configured for purifying the used industrial oil by using a separation booster which is dedicated for this specific industrial oil;

at least one analyzing device which is configured for identifying depletion of certain (functional) additives, such as the at least one specific additive, in a used industrial oil which has been returned to the oil recovery system after use in the specific system or specific type of system;

wherein said additive providing device is further configured for adding to the returned used oil the (functional) additive(s), such as the at least one specific additive, which has/have been identified as having been depleted during the use and in an amount corresponding to the amount of depletion identified by the at least one analyzing device.

Hereby with such a method and in such a plant, an industrial oil can be designed for use in a specific system or specific type of system and designed such that it is suitable to be purified with a dedicated separation booster. Hereby used oil which is returned to the plant can be optimally recovered, both by purifying the oil and by adding depleted additives to the oil. The fact that the industrial oil is specifically designed from the beginning for a specific system and for a specific separation booster will improve the recovery efficiency a lot because both the base oils and the additives can be chosen to be compatible with the separation booster. Hereby an industrial oil which is designed according to the present teachings can be recovered between uses and be used over and over again in a specific system or in a specific type of system. Hereby oil consumption will be decreased and the natural resources of oil can be saved. Furthermore the oil recovery method as used in the present teachings is environmentally friendly and does not produce emissions harmful to the environment as is the case for example in re-refining processes for used oil. Moreover, with the method for circular use (purification) of industrial oil according to the present teachings, additives provided in the industrial oil also will be reused in contrast to embodiments in which a used oil is recovered in a re-refining process and thus remaining additives are removed. In a method according to the present teachings, any remaining (functional) additives in the used industrial oil are kept in the oil and new additives are added (replenished) to compensate (top up, replenish) any (functional) additives which were consumed during use. This is possible because the designed oil is always used in the same system or same type of system as it was initially designed for. Furthermore, in a method for circular use (purification) of industrial oil according to the present teachings, the oil product is not ranked down (downgraded) to waste after use but is instead kept in the same oil class (i.e. the product class during the whole recirculation process). This is possible because the used oil is not mixed with other used oil products but is kept for its initial purpose.

In another embodiment of the present teachings, analyzing the removed used oil may further comprise analyzing the removed used oil to identify an amount of contaminants in the oil and possibly repeating the purifying step if the identified amount of contaminants is above a predefined threshold.

In another embodiment of the present teachings, the method may further comprise providing a top up additive package for each designed industrial oil for use in a specific system or type of system, wherein the top up additive package comprises functional additives to meet required technical specifications for use in the specific system or type of system.

In another embodiment of the present teachings, purifying the removed used oil may comprise:
mixing the used oil with the separation booster in an oil purification tank;
warming the mixture; and
waiting for the booster and contaminants to settle (separate) in a top or bottom phase in the oil purification tank.

In another embodiment of the present teachings, purifying may further comprise filtering the used oil.

In another embodiment of the present teachings, filtering may comprise adding cellulose fibers to a portion of the used oil and circulating this portion of the used oil with added cellulose fibers over a carrier paper to build up a depth filter and then filtering the rest of the used oil through the depth filter.

In another embodiment of the present teachings, designing an industrial oil may comprise:
providing a concentrated industrial oil comprising functional additives to meet required technical specifications for use in the specific system or type of system;
delivering said concentrated industrial oil to an oil recovery system; and
finalizing an industrial oil for use in a specific system or specific type of system by mixing said concentrated industrial oil with at least one base oil at (in) the oil recovery system.

In another embodiment of the present teachings, purifying the removed used oil and adding (functional) additives to the removed used oil and at least parts of the step of designing the industrial oil may be performed at (in) an oil recovery system.

In another embodiment of the present teachings, analyzing the used oil to identify depletion of certain (functional) additives in the oil may comprise analyzing an amount of one or more specific (functional) additives in the oil which the at least one specific additive has been predefined for this specific system or specific type of system.

In another embodiment of the present teachings the (functional) additives, such as the at least one specific additive, added to the removed used oil can be one or more of oxidation inhibitors, corrosion inhibitors, rust inhibitors, metal deactivators, anti-wear agents, extreme pressure agents, friction modifiers, detergents, dispersants, pour point depressants, viscosity index improvers, foam inhibitors, adhesion promotors, emulsifiers and bactericides.

In another embodiment of the present teachings the at least one oil component tank may comprise at least one oil concentrate tank comprising a concentrated industrial oil comprising one or more functional additives to meet required technical specifications for use in a specific system or type of system, whereby an industrial oil for use in a specific system or specific type of system can be prepared in the oil preparation tank by mixing said concentrated industrial oil provided from the oil concentrate tank with at least one base oil provided from at least one base oil tank.

In another embodiment of the present teachings the at least one oil purification tank may comprise:
- a booster adding device configured for adding a separation booster to the used oil in the purification tank; and
- a mixing device for mixing the returned used oil with the separation booster.

In another embodiment of the present teachings an outlet from the purification tank may be connected to an inlet of at least one of the at least one oil preparation tanks, possibly through a filtering device.

In another embodiment of the present teachings the additive adding device is configured for adding one or more (functional) additives which can be one or more of oxidation inhibitors, corrosion inhibitors, rust inhibitors, metal deactivators, anti-wear agents, extreme pressure agents, friction modifiers, detergents, dispersants, pour point depressants, viscosity index improvers, foam inhibitors, adhesion promotors, emulsifiers and bactericides.

In another embodiment of the present teachings the analyzing device may be configured for analyzing the removed used oil to identify an amount of contaminants in the oil.

In another embodiment of the present teachings a return line may be provided from at least one oil preparation tank to at least one oil purification tank such that oil can be returned to the oil purification tank for further purification if the identified amount of contaminants is above a predefined threshold.

DETAILED DESCRIPTION OF EMBODIMENTS

Figure 1A:
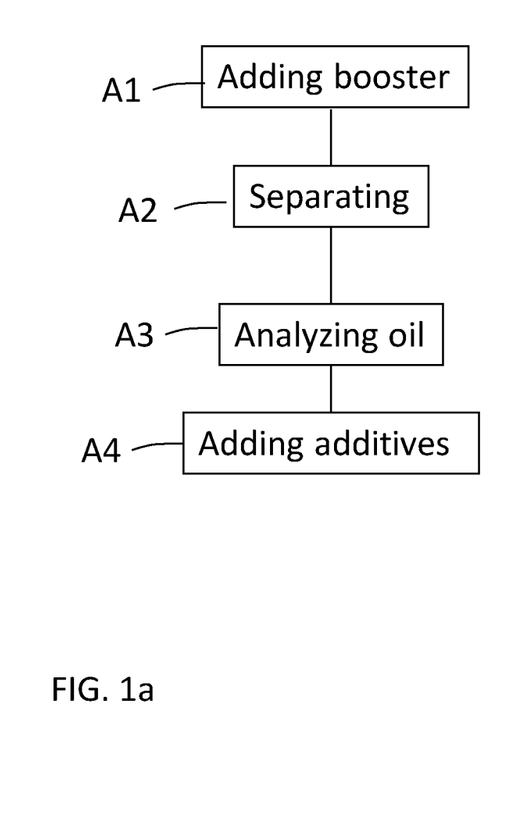
FIGS. 1a and 1b show flow charts of methods according to two embodiments of the present teachings.

FIG. 1a shows a flow chart of a method for circular use (purification) of industrial oil according to one embodiment of the present teachings. The method comprises reconditioning a used industrial oil and said reconditioning comprises:

A1: Adding a liquid separation booster to a used industrial oil, wherein said separation booster is designed to attract impurities in the used oil and to be passive with respect to, i.e. not attracting, at least one specific additive in the oil. The separation booster may suitably be passive with respect to, i.e. not attract, more than one specific additive or even most of the additives provided in the oil or even all additives provided in the oil.

A2: Separating out the separation booster with attracted impurities from the used industrial oil while leaving the at least one specific additive in the oil. The step of separating the separation booster with attracted impurities from the used industrial oil may comprise one or more of the following steps: mixing the used oil with the separation booster, warming the mixture, waiting for the separation booster with attracted impurities to settle (separate) in a top or bottom phase in the oil purification tank, centrifuging the mixture of used oil and separation booster, filtering the mixture of used oil and separation booster and filtering an oil phase after separation booster with attracted impurities has settled (separated) to a top or bottom phase.

Hereby a method for circular use (purification) of industrial oil is provided where impurities in a used industrial oil can be removed without the risk of also removing additives from the oil. A liquid separation booster is used which is specifically designed such that it will attract impurities but not additives. Hereby an effective reconditioning of the used industrial oil is achieved.

The liquid separation booster is substantially insoluble in the oil, forming a two phase mixture upon mixing, and wherein said separation booster attracts impurities in the oil during mixing of oil and separation booster and wherein the separation booster has a sufficiently big difference in polarity compared to the polarity of the at least one specific additive in the industrial oil such that the at least one specific additive is not soluble in the separation booster.

A separation booster which is used for the purification of oil in this present teachings is substantially insoluble in the oil, forming a two phase mixture upon mixing and in some embodiments having a density different from that of the oil to be purified. Said separation booster attracts impurities in the oil during mixing of the oil and the separation booster.

The use of a separation aid, which may also be called a chemical booster or separation booster, for capturing impurities in contaminated oil has been described before as discussed above. A liquid separation booster/aid is added to the oil and mixed therewith and impurities in the oil will be captured by the separation aid and will accumulate in a phase which can be separated, for example, in a bottom phase.

The separation aid will chemically interact with and thereby absorb (attract, bind to) contaminating solids and/or dissolved impurities in the contaminated target oil. The separation aid should be a liquid at the temperature at which the process is carried out. The separation aid composition should be at least substantially insoluble in the contaminated target oil, so that it forms a two-phase liquid mixture upon mixing with the contaminated oil. The liquid separation aid can also have a density different from that of the contaminated oil to be purified.

The separation aid (separation booster) is not soluble in the contaminated target oil because of its polar properties and thus colloids consisting of small droplets of the liquid separation aid composition are formed by the stirring, which through chemical interactions (hydrophilic, hydrophobic, and charge interactions) may absorb unwanted solid and/or the dissolved impurities in the contaminated target oil. In instances where the separation aid has a higher density than the oil, the separation aid will, as a result of gravity, separate from the oil and thereby form a lower (bottom) phase together with the solid and/or dissolved impurities. In instances where the separation aid has a lower density than the contaminated target oil, it will form an upper (top) phase as a result of gravity separation.

The liquid separation aid/booster for use in the present teachings can generally be made up based on the following components: a) a polar polymer; b) a hydrotrope/solubilizer; and c) a co-tenside.

Suitable separation aids having the properties described above, which can be used in the processes according to the present teachings, may e.g. constitute a composition comprising a mixture of polar polymers such as polyethylene glycols, polypropylene glycols or similar polyalkylene glycols, organic surface active components having nonionic, anionic, cationic and amphoteric properties with the ability to enhance the solubility of solid or dissolved impurities into the separation aid.

One example of a separation aid which can be used in this present teachings comprises: a) at least one polar polymer that is not soluble in oil and has a higher density than the oil, such as a polyethylene glycol having an average molecular weight of 190-210 g/mole, e.g. Carbowax PEG 200 (Dow Chemical Company); b) at least one surface active hydrotrope/solubilizer, such as anionic sulfonic acids, phosphate ester-based substances or non-ionic surfactants from the poly-glycoside family, such as Simulsol SL 4, Simulsol SL 7 G and Simulsol AS 48 (Seppic, Air Liquide group); c) at least one amphoteric co-surfactant, such as a propionate type, e.g. Ampholak YJH-40 (Akzo Nobel) which is a sodium caprylimino dipropionate.

In some embodiments of the present teachings, the reconditioning further comprises:

A4: Adding additives to the used oil. Hereby additives which have been depleted during use of the industrial oil can be added and the industrial oil can be used and re-circulated even longer.

In some embodiments of the present teachings, the reconditioning further comprises a step of analyzing which is performed before the step of adding the additives:

A3: Analyzing the used oil to identify depletion of certain additives in the used oil, wherein the step of adding additives (A4) to the used oil comprises adding those additives which have been identified as having been depleted and in an amount corresponding to the identified amount of depletion. This step of analyzing (A3) is performed before the step A4 of adding additives.

Figure 1B:
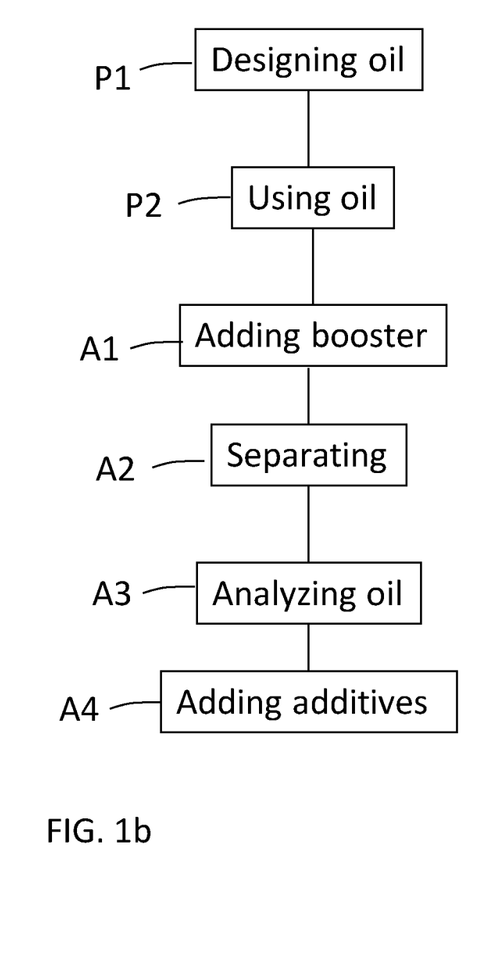

A flow chart for another embodiment of the present teachings is shown in FIG. 1b. Steps A1-A4 are the same as described in relation to FIG. 1a and will not be described again but in this embodiment there are a few initial steps performed before the steps A1-A4. The method for circular use (purification) of industrial oil comprises, in this embodiment of the present teachings, the first steps (performed before steps A1-A4) of:

P1: Designing an industrial oil which is specifically designed for being suitable to purify with a dedicated separation booster, which separation booster is at least substantially insoluble in the oil, forming a two phase mixture upon mixing, said separation booster attracting impurities in the oil during mixing of oil and separation booster, wherein said designing of an industrial oil comprises providing a mixture of base oils and adding functional additives to the mixture of base oils, wherein said base oils and additives are chosen to have a sufficiently big difference in polarity compared to the polarity of the separation booster such that the base oils and additives are not soluble in the separation booster.

The types of base oils are chosen for being suitable to purify with a dedicated separation booster. Hereby the base oils are chosen to have a sufficiently big difference in polarity compared to the polarity of the separation booster such that the base oils are not soluble in the separation booster. Also the densities of the base oils can be chosen to be different from the density of the separation booster in order to improve separation efficiency. Examples of base oils which can be used are described by the American Petroleum Institute base oil classification as Base Oil Group I, Base Oil Group II, Base Oil Group III, Base Oil Group IV and Base Oil Group V. These base oils are provided in any required mixture to enhance the oil properties for the use in a specific system or a specific type of system. In order to design an oil product that can withstand long and repeated use in a circulating system, the choice of base oils is also based on the quality and stability characteristics of each oil, such as oxidation-, thermal-and hydrolytic stability. There is the possibility to choose a more refined oil (Group 3 instead of Group 1 and 2), a synthetic instead of mineral oil or a higher quality within a specific Base Oil Group.

The design of the oil further comprises as said above the addition of specific functional additives to the mixture of specific base oils in order to enhance the oil properties for use in a specific system or specific type of system. Specific functional additives can comprise one or more of oxidation inhibitors, corrosion inhibitors, rust inhibitors, metal deactivators, anti-wear agents, extreme pressure agents, friction modifiers, detergents, dispersants, pour point depressants, viscosity index improvers, foam inhibitors, adhesion promotors, emulsifiers and bactericides. The design of the oil comprises a durable stable mixture of the base oil mixture enhanced by a suitable mixture of additives for use in the specific system or specific type of system. The additives are chosen such that they are suitable for use together with the dedicated separation booster, i.e. additives are chosen having a sufficiently big difference in polarity compared to the polarity of the separation booster such that the additives are not soluble in the separation booster.

P2: Using said specifically designed industrial oil before the used oil is reconditioned as described above according to the steps A1-A4 by using the dedicated separation booster.

According to some embodiments of the present teachings, the steps of reconditioning a used oil (A1-A4) are performed inline in a system which is using the industrial oil, such that reconditioning is performed in a closed circuit circulation system of the industrial oil.

According to some embodiments of the present teachings the method is instead performed offline and the method further comprises retrieving used industrial oil from an industrial plant, reconditioning the used industrial oil as described above according to steps A1-A4 and returning the reconditioned oil to an industrial plant for further use and possibly a first optional step of delivering a specifically designed industrial oil to an industrial plant.

Figure 2:
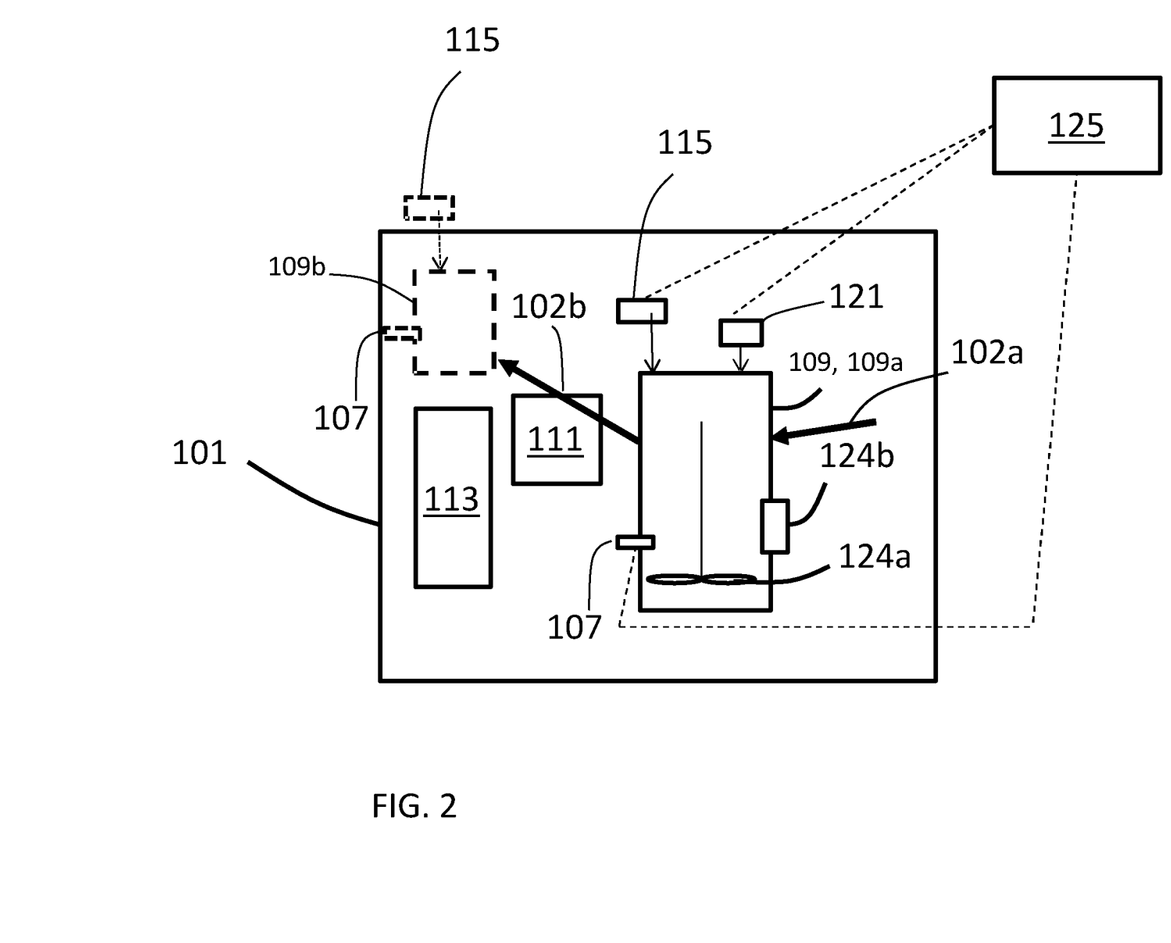
FIG. 2 is a schematic view of an oil recovery system according to one embodiment of the present teachings.

FIG. 2 schematically shows an oil recovery system 101 according to one embodiment of the present teachings. The oil recovery system 101 comprises at least one oil purification tank 109 into which used industrial oil is provided for purification. The oil recovery system 101 further comprises a booster adding device 121 connected to the oil purification tank 109 and configured for adding a liquid separation booster to the used oil in the oil purification tank 109, wherein said separation booster is designed to attract impurities in the used oil and to be passive with respect to, i.e. not attracting, at least one specific additive in the used oil. The oil recovery system 101 further comprises a separation device configured for separating out the separation booster with attracted impurities from the used industrial oil while leaving the at least one specific additive in the oil. The separation device may comprise one or more of the following: a mixing device 124a for mixing the used oil with the separation booster, a heating device 124b for warming the mixture, a centrifuging device (not shown) configured for centrifuging the mixture of used oil and separation booster and a filtering device 111 configured for filtering the mixture of used oil and separation booster or for filtering an oil phase after separation booster with attracted impurities has settled (separated) to a top or bottom phase.

The oil recovery system 101 may further comprise an additive providing device 115 configured for adding additives to the used oil and at least one analyzing device 107 which is configured for analyzing the used oil to identify an amount of depletion of certain additives in the used oil before adding additives to the used oil, wherein the additive providing device 115 is configured for adding those additives which have been identified as having been depleted and in an amount corresponding to the identified depletion. The oil purification tank 109 also comprises an inlet 102*a* for receiving used oil to be purified and an outlet 102*b* for forwarding purified oil which possibly also has been topped up with new additives. The outlet 102*b* may be via a filtering device 111. In some embodiments of the present teachings the oil recovery system 101 comprises one oil purification tank 109*a* and a separate top up tank 109*b* whereby purified oil is forwarded from the oil purification tank 109*a*, possible via a filtering device 111, to the top up tank 109*b*. In this embodiment (also illustrated in FIG. 2, but with dotted lines), the analyzing device 107 and the additive providing device 115 are connected to the top up tank 109*b* instead of to the oil purification tank 109*a*.

In some embodiments, the oil recovery system 101 may optionally further comprise at least one oil preparation tank 113 configured for designing an industrial oil which is specifically designed for being suitable to purify with a dedicated separation booster, which separation booster is at least substantially insoluble in the oil, forming a two phase mixture upon mixing, said separation booster attracting impurities in the oil during mixing of oil and separation booster, wherein said designing of an industrial oil comprises providing a mixture of base oils and adding functional additives to the mixture of base oils, wherein said base oils and additives are chosen to have a sufficiently big difference in polarity compared to the polarity of the separation booster such that the base oils and additives are not soluble in the separation booster.

Said oil recovery system 101 may be designed as an inline system, so that the oil recovery system is integrable in a closed circuit circulation system of the industrial oil.

Alternatively said oil recovery system 101 is provided as an offline system in which industrial oil from different industries can be reconditioned.

The oil recovery system may also comprise or may be connectable to a control system 125 which can be connected to for example the booster adding device 121, the at least one analyzing device 107 and the additive providing device 115 for controlling these functions. The control system 125 may also be connected to the separation device and to pumps and valves in the oil recovery system such that flows can be controlled in the oil recovery system 101.

Figure 3:
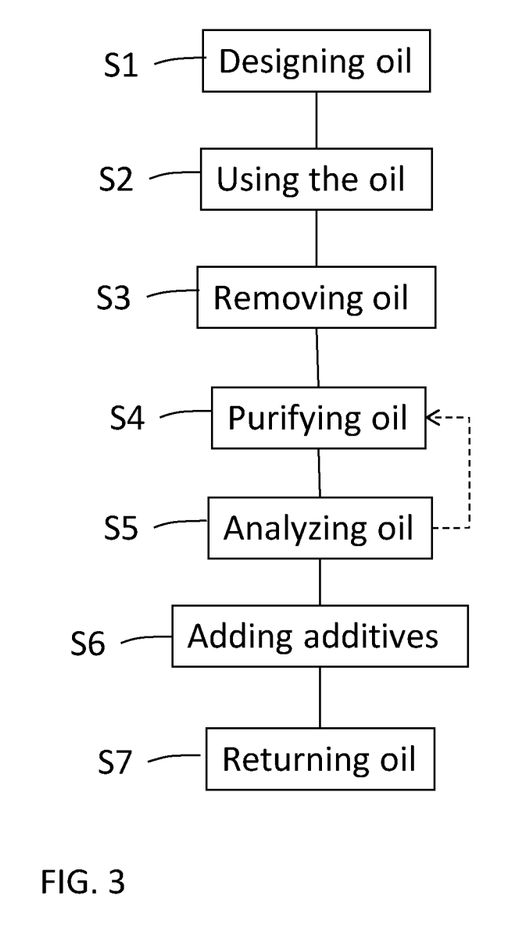
FIG. 3 is a flow chart of a method according to another embodiment of the present teachings.

FIG. 3 is a flow chart of a method for circular use (purification) of industrial oil according to one embodiment of the present teachings. The method steps are described in order below:

S1: Designing an industrial oil for use in a specific system or in a specific type of system. The designing of the oil comprises providing a mixture of base oils and adding functional additives to the mixture of base oils to meet required technical specifications for use in the specific system or type of system. The types of base oils are chosen for being suitable to purify with a dedicated separation booster. Hereby the base oils are chosen to have a sufficiently big difference in polarity compared to the polarity of the separation booster such that the base oils are not soluble in the separation booster. Also the densities of the base oils can be chosen to be different from the density of the separation booster in order to improve separation efficiency. Examples of base oils which can be used are described by the American Petroleum Institute base oil classification as Base Oil Group I, Base Oil Group II, Base Oil Group III, Base Oil Group IV and Base Oil Group V. These base oils are provided in any required mixture to enhance the oil properties for the use in a specific system or a specific type of system. In order to design an oil product that can withstand long and repeated use in a circular system, the choice of base oils is also based on the quality and stability characteristics of each oil, such as oxidation-, thermal-and hydrolytic stability. There is the possibility to choose a more refined oil (Group 3 instead of Group 1 and 2), a synthetic instead of mineral oil or a higher quality within a specific Base Oil Group.

The design of the oil further comprises as said above the addition of specific functional additives to the mixture of specific base oils in order to enhance the oil properties for use in a specific system or specific type of system. Specific functional additives can comprise one or more of oxidation inhibitors, corrosion inhibitors, rust inhibitors, metal deactivators, anti-wear agents, extreme pressure agents, friction modifiers, detergents, dispersants, pour point depressants, viscosity index improvers, foam inhibitors, adhesion promotors, emulsifiers and bactericides. The design of the oil comprises a durable stable mixture of the base oil mixture enhanced by a suitable mixture of additives for use in the specific system or specific type of system. The additives are chosen such that they are suitable for use together with the dedicated separation booster, i.e. additives are chosen having a sufficiently big difference in polarity compared to the polarity of the separation booster such that the additives are not soluble in the separation booster.

S2: Using the designed oil in the specific system or the specific type of system.

S3: Removing the designed oil from the system after use for a specific time.

This could be a preset time which is based on previous experience or it could be based on oil quality measurements provided in the system.

S4: Purifying the removed used oil with the dedicated separation booster. The step of purifying comprises suitably mixing the used oil with the separation booster in an oil purification tank 9. In some embodiments of the present teachings the contents of the purification tank 9 are also warmed to improve the purification and in some embodiments of the present teachings the mixture of used oil and separation booster is allowed to separate into different phases in this step of the purification. For example the booster and contaminants can settle in a bottom or a top of the oil purification tank if the booster has a different density than the oil. The step of purifying can in some embodiments also comprise a step of filtering the used oil. Optionally, the mixture of used oil and separation booster can be filtered almost directly after mixing without waiting for the separation booster and contaminants to separate, for example by settling to a bottom part of the purification tank. In that case the separation booster together with captured contaminants will be trapped in the filter. In another embodiment the mixture of used oil and separation booster will first be allowed to settle such that the separation booster with captured contaminants from the oil will separate into a separate phase, for example a bottom phase, and then the other phase comprising purified used oil is filtered in order to filter out any possible remaining contaminants. The step of filtering may comprise a step of building up a depth filter from a cellulose fiber powder. This can be done by adding cellulose fibers to either a portion of the used oil with separation booster mixed in it or a portion of a purified used oil in which most of the separation booster and contaminants have been separated out already and circulating this portion of the used oil with added cellulose fibers over a carrier layer whereby a depth filter is built up on the carrier layer. Thereafter the rest of the used oil is filtered through this depth filter. Another type of filter can of course also be used for the filtering step. Either a depth filter, for example a commercially available cellulose depth filter, or another type of filter can be used.

S5: Analyzing the removed used oil to identify an amount of depletion of certain additives in the oil. This step can comprise analyzing the amount of specific additives in the oil which specific additives have been predefined for this specific system or specific type of system.

S6: Adding to the removed used oil those additives which have been identified as having been depleted during the use and in an amount corresponding to the identified depletion.

S7: Returning purified oil which also has been topped up with additives for further use in the specific system or specific type of system it initially was designed for.

In one embodiment of the present teachings the step of analyzing the removed used oil, S5, further comprises analyzing the removed used oil to identify an amount of contaminants in the oil and possibly repeating the purifying step, S4, if the identified amount of contaminants is above a predefined threshold. Alternatively the amount of contaminants is analyzed before the purification step such that an amount of separation booster to use can be adopted (selected) according to the analyzed amount of contaminants contained in the used oil. If no analysis of the amount of contaminants is done before the purifying step, an amount of separation booster can be added based on the volume of oil to be purified.

In one embodiment of the present teachings the method comprises providing a top up additive package for each designed industrial oil for use in a specific system or type of system. Said top up additive package comprises functional additives to meet required technical specifications for use in the specific system or type of system. This top up additive package can be used in step S6 for adding to the removed used oil those additives which have been identified as depleted during the use. The amount of top up additive package to add to the used oil should then be adopted (selected) according to the identified depletion of additives in step S5.

In one embodiment of the present teachings the step of designing an industrial oil, S1, comprises:
  providing a concentrated industrial oil comprising functional additives to meet required technical specifications for a specific system or type of system;
  delivering said concentrated industrial oil to an oil recovery system (1); and
  finalizing an industrial oil for use in a specific system or specific type of system by mixing said concentrated industrial oil with at least one base oil at (in) the oil recovery system.

The step of providing a concentrated industrial oil comprises designing the concentrated industrial oil for being suitable to purify with a dedicated separation booster as described above. The concentrated industrial oil can in some embodiments of the present teachings and for use in some systems or type of systems comprise the same set up of functional additives as the top up additive package used for topping up a used oil as described above. The concentrated industrial oil and the top up additive package can actually be the same product but just added in different amounts during the design of the oil and during the top up of the used oil.

Figure 4:
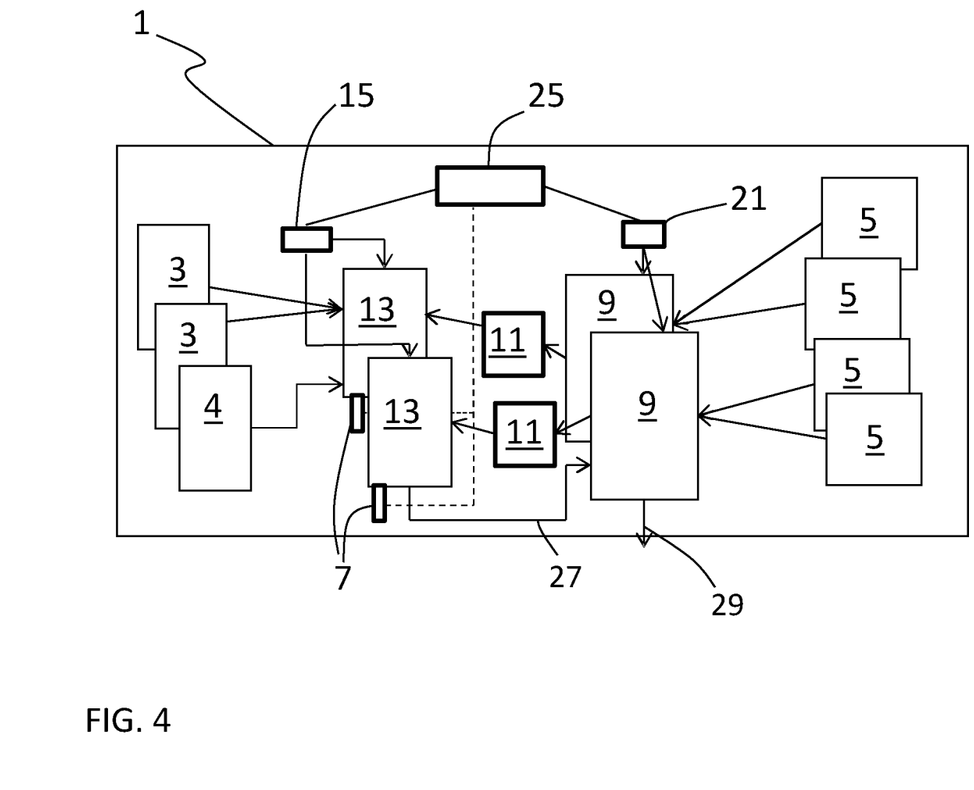
FIG. 4 is a schematic view of an oil recovery system according to another embodiment of the present teachings.

FIG. 4 is a schematic view of an oil recovery system 1 according to one embodiment of the present teachings. The method described above in relation to FIG. 3 can be performed, at least in parts in such an oil recovery system 1.

The oil recovery system 1 comprises at least one oil preparation tank 13 in which an industrial oil can be designed for use in a specific system or in a specific type of system and for being suitable to purify with a dedicated separation booster as described above. At least one of the oil preparation tanks 13 can be connected to and can be provided with content from one or more oil component tanks 3, 4. In the embodiment shown in FIG. 4 only one of the two oil preparation tanks 13 is connected to the oil component tanks 3, 4; however in another embodiment all the oil preparation tanks can be connected to the oil component tanks 3, 4. The oil component tanks can be one or more base oil tanks 3 comprising one or more different base oils which can be provided to the oil preparation tank 13 when an oil is being designed. The oil component tanks can also comprise an oil concentrate tank 4 comprising a concentrated industrial oil which has been provided to the oil recovery system 1. Hereby an industrial oil for use in a specific system or specific type of system can be prepared in an oil preparation tank 13 by mixing said concentrated industrial oil provided from the oil concentrate tank 4 with one or more base oils provided from one or more base oil tanks 3. Such a concentrated industrial oil can be prepared beforehand at another location and thus can be adapted for different systems or type of systems beforehand. The concentrated industrial oil comprises functional additives suitably mixed in a small amount of oil. The additives are chosen to meet required technical specifications for a specific system or type of system as described above. Hereby a final preparation of an industrial oil at (in) the oil recovery system 1 can be facilitated. The number of oil component tanks 3, 4, such as base oil tanks 3 and oil concentrate tanks 4, can of course be varied. The base oil tanks 3 and the oil concentrate tanks 4 need not be stationary parts of an oil recovery system 1 but can instead be any type of vessel, such as single use vessels or reusable vessels used for delivering the base oil and oil concentrate products to the plant.

The oil recovery system 1 further comprises an additive providing device 15 which is connected to said at least one oil preparation tank 13. In the embodiment shown in FIG. 4 two oil preparation tanks 13 are shown and both are connected to the additive providing device 15. Hereby functional additives can be provided to the oil preparation tanks 13. Said additive providing device 15 is configured for providing functional additives which are chosen to meet required technical specifications for use in the specific system or type of system. Hereby said additive providing device 15 can comprise a number of different functional additives, such as for example oxidation inhibitors, corrosion inhibitors, rust inhibitors, metal deactivators, anti-wear agents, extreme pressure agents, friction modifiers, detergents, dispersants, pour point depressants, viscosity index improvers, foam inhibitors, adhesion promotors, emulsifiers and bactericides. Different additives can be provided to the oil preparation tanks 13 for different industrial oils to be prepared. This can be controlled from a control system 25 and can be dependent on sensor measurements as will be further described below. In some embodiments the additive providing device 15 and the oil concentrate tank 4 can be combined into one. The additive providing device 15 can be used for topping up a used oil in accordance with how much of the additives have been consumed during the use. In some systems this top up of used oil will require the same mixture of functional additives as was provided in an initially provided oil concentrate for the initial design of the oil.

Hereby the additive providing device 15 and the oil concentrate tank 4 can in some embodiments be combined. A top up additive package, which may be the same as the oil concentrate used for designing the oil, can in some embodiments of the present teachings be provided to the oil recovery system 1 for being used by the additive providing device 15 for topping up used oil. The dosage of additives and/or top up additive package needed for topping up used oil need(s) to be controlled in accordance with the measured additive depletion in the used oil as will be further described below.

The oil recovery system 1 further comprises at least one used oil tank 5 which is configured for receiving used industrial oil which has been returned to the oil recovery system 1 after use in the specific system or specific type of system. These used oil tanks need not be stationary parts of the oil recovery system but can instead be for example a transport vessel used for delivering the used oil to the plant.

According to the present teachings, industrial oil which is specifically designed for a specific system or specific type of system is produced in an oil preparation tank 13 at (in) the oil recovery system 1. This specifically designed industrial oil is then delivered from the oil recovery system 1 to a system for which it was designed and the oil is used in this system for either a predefined time period or until tests indicate that the oil needs recovery, i.e. the oil comprises too many impurities or too little additives which are needed in this system. The used oil is then returned to the oil recovery system 1 for recovery. The used oil can be received in a used oil tank 5 at the plant or alternatively transport vessels used for delivering the used oil are directly connected to the plant and act as used oil tanks 5 according to the schematic illustration in FIG. 4. In this embodiment four different used oil tanks 5 are provided; however another number of tanks can of course be provided.

The oil recovery system 1 further comprises at least one oil purification tank 9 connected to the at least one used oil tank 5. In this embodiment two oil purification tanks 9 are provided; however another number of oil purification tanks can of course be provided.

Each used oil tank 5 should be connected to at least one oil purification tank 9. The oil purification tank 9 is configured for purifying the used industrial oil by using a dedicated separation booster for this specific industrial oil.

In one embodiment of the present teachings the oil purification tank 9 comprises:
 a booster adding device 21 configured for adding a separation booster to the used oil in the purification tank 9;
 a mixing device for mixing the returned used oil with the separation booster; and
 a heating device for warming the mixture, whereby booster and contaminants can settle (separate) in a separate phase, for example a separable bottom or top phase, in the oil purification tank.

However, in another embodiment of the present teachings it will not be necessary to wait for the separation booster together with contaminants to settle (separate) into a bottom or top phase. In this embodiment the mixture of used oil and separation booster is directly filtered in a filter 11 as will be further described below.

In the embodiment shown in FIG. 4 a booster adding device 21 is (fluidly) connected to the two oil purification tanks 9. The booster adding device 21 is further (electrically) connected to a control system 25. The addition of booster into the oil purification tanks 9 can thereby be controlled by the control system 25, possibly in accordance with the volume of used oil to be purified or in accordance with a measurement of the amount of contaminants in the used oil. This will be further described below.

The oil purification tanks 9 are, in this embodiment, each connected through a respective filter 11 to the oil preparation tanks 13. Hereby for example an upper portion of the purified oil in the oil purification tanks 9, i.e. without the booster and contaminants which in this example have settled to the bottom of the oil purification tanks 9, can be transferred to the oil preparation tanks 13 through a filter 11. If no filter is used in the system the oil preparation tank 13 and the oil purification tank 9 can be combined into one tank. However the filter 11 is suitable in order to further improve the recovery of the oil. The filtering device 11 can for example be a depth filtering device using cellulose fibers which can be added to a portion of the returned used oil for circulation over a carrier paper before the rest of the used oil is filtered through the depth filter. In an embodiment of the present teachings in which separation booster is added in the oil purification tank and a mixture of the used oil and separation booster is directly filtered without a first separation, the whole mixture is filtered and separation booster with captured contaminants will get trapped in the filter. A depth filter as described above may, in this embodiment, be especially suitable. Aggregates of separation booster and attached contaminants will effectively get trapped in the depth filter and furthermore any possible contaminants which may not have been captured by the separation booster will also effectively get trapped in the depth filter by the combined effect of cellulose fibers and separation booster in the filter.

In the embodiment in which separation booster and contaminants, i.e. sludge, has settled to for example the bottom of the oil purification tanks 9, such sludge can be removed through a sludge outlet 29 in the bottom part of the oil purification tanks 9.

The oil recovery system 1 further comprises at least one analyzing device 7 which is configured for identifying depletion of certain additives in a used industrial oil which has been returned to the oil recovery system 1 after use in the specific system or specific type of system. In the embodiment shown in FIG. 4 the analyzing device 7 is provided in the oil preparation tanks 13. Analyzing devices can however also be provided in the oil purification tanks 9 or in the used oil tanks 5. The analyzing devices 7 can be configured for measuring the content of certain additives in the oil such that depleted additives can be added to the oil again before delivery for further use. The analyzing devices 7 can however in another embodiment instead be configured for only taking samples which are transferred to another location, for example outside the plant, for analyzing the content of additives in the oil.

According to the present teachings the additive providing device 15 is configured for adding to the returned used oil those additives which have been identified as having been depleted during the use and in an amount corresponding to the depletion identified by the at least one analyzing device 7. Hereby both the analyzing devices 7 and the additive providing device 15 are connected to the control system 25 such that the control system can control the addition of additives in accordance with the analysis output from the analyzing device 7.

As discussed above the amount of contaminants in the used oil also can be measured. This can be measured in the used oil tanks 5, in the oil purification tanks 9 and/or in the oil preparation tanks 13. If an amount of contaminants is measured by the analyzing device 7 in the oil preparation tanks 13, i.e. after the oil has been purified in the oil purification tanks 9, a return line 27 can be provided from the oil preparation tanks 13 back to the oil purification tanks, through which return line 27 oil can be returned for further purification in an oil purification tank 9 if the amount of contaminants is above a predefined threshold.

The invention claimed is:

1. A method for reconditioning a used industrial oil that has been used in a system or device, comprising:
    adding a liquid separation booster to the used industrial oil, wherein the separation booster attracts one or more impurities in the used oil and does not attract at least one specific additive in the used industrial oil; and
    separating out the separation booster with attracted impurities from the used industrial oil while leaving the at least one specific additive in the used industrial oil;
    wherein the separation booster comprises a polar polymer, a hydrotrope/solubilizer, and a co-tenside.

2. The method according to claim 1, wherein:
    the liquid separation booster is at least substantially insoluble in the used industrial oil and forms a two phase mixture upon mixing with the used industrial oil,
    the separation booster attracts the one or more impurities in the used industrial oil during mixing of the used industrial oil and the separation booster,
    the separation booster has a first polarity,
    the at least one specific additive in the used industrial oil has a second polarity, and
    the first polarity sufficiently differs from the second polarity such that the at least one specific additive is not soluble in the separation booster.

3. The method according to claim 1, wherein the separating step comprises one or more of:
    mixing the used industrial oil with the separation booster,
    warming a mixture of the used industrial oil and the separation booster,
    waiting for the separation booster with attracted impurities to settle and separate from a used industrial oil phase in a top or bottom phase in an oil purification tank,
    centrifuging the mixture of the used industrial oil and the separation booster,
    filtering the mixture of the used industrial oil and the separation booster, and
    filtering the used industrial oil phase after the separation booster with attracted impurities has settled to the top or bottom phase.

4. The method according to claim 1, further comprising:
    preparing an industrial oil for purification with the separation booster that is at least substantially insoluble in the industrial oil and forms a two phase mixture upon mixing with the industrial oil, the separation booster attracting one or more impurities in the used industrial oil during mixing of the used industrial oil and the separation booster,
    wherein:
    the industrial oil is prepared by adding the at least one specific additive to a mixture of base oils, and
    the mixture of the base oils and the at least one specific additive has a polarity that sufficiently differs from a polarity of the separation booster such that the base oils and at least one specific additive are not soluble in the separation booster.

5. The method according to claim 1, wherein the method is performed inline in a closed circuit circulation system of the industrial oil.

6. The method according to claim 1, wherein the method is performed offline and the method further comprises:
    retrieving the used industrial oil from an industrial plant,
    performing one or both of the adding and separating steps outside of the industrial plant, and
    returning the reconditioned oil to the industrial plant for further use.

7. The method according to claim 4, further comprising:
    prior the adding step, circulating industrial oil in the system or device and then removing the used industrial oil from the system or device after a specific amount of time; and
    after reconditioning, returning purified oil to the system or device for further circulation in the system or device.

8. The method according to claim 7, wherein the method further comprises:
    providing a top up additive package for the industrial oil for use in the system or device,
    wherein the top up additive package comprises the at least one specific additive in an amount to meet required technical specifications for use in the system or device.

9. The method according to claim 7, wherein the adding step further comprises:
    mixing the used industrial oil with the separation booster in an oil purification tank;
    warming the mixture; and
    waiting for the separation booster and attached contaminants to settle in a top or bottom phase in the oil purification tank.

10. The method according to claim 7, wherein the separating step further comprises filtering the used industrial oil.

11. The method according to claim 9, wherein the separating step comprises:
    adding cellulose fibers to a first portion of the used industrial oil,
    filtering the first portion of the used industrial oil containing the added cellulose fibers through a carrier paper to build up a depth filter on the carrier paper, and
    then filtering a second portion of the used industrial oil, which does not contain cellulose fibers, through the depth filter and carrier paper.

12. The method according to claim 7, wherein the industrial oil is prepared by:
    providing a concentrated industrial oil comprising the at least one specific additive in an amount to meet required technical specifications for use in the system or device;
    delivering the concentrated industrial oil to an oil recovery system; and
    finalizing the industrial oil for use in the system or device by mixing the concentrated industrial oil with the mixture of base oils at the oil recovery system.

13. The method according to claim 7, wherein the adding and separating steps and at least one part of the step of preparing the industrial oil are performed at an oil recovery system.

14. The method according to claim 1, wherein the at least one specific additive is selected from the group consisting of one or more of oxidation inhibitors, corrosion inhibitors, rust inhibitors, metal deactivators, anti-wear agents, extreme pressure agents, friction modifiers, detergents, dispersants, pour point depressants, viscosity index improvers, foam inhibitors, adhesion promotors, emulsifiers and bactericides.

15. The method according to claim 2, wherein the at least one specific additive is selected from the group consisting of one or more of oxidation inhibitors, corrosion inhibitors, rust inhibitors, metal deactivators, anti-wear agents, extreme pressure agents, friction modifiers, detergents, dispersants, pour point depressants, viscosity index improvers, foam inhibitors, adhesion promotors, emulsifiers and bactericides.

16. The method according to claim 15, wherein the two-phase mixture contains colloids that form upon mixing the used industrial oil with the separation booster, the colloids being composed of droplets of the separation booster and absorbed contaminants, said contaminants being at least one of solid contaminants or dissolved impurities.

17. The method according to claim 1, wherein:
the polar polymer comprises a polyalkylene glycol,
the hydrotrope/solubilizer comprises an anionic sulfonic acid, a phosphate ester-based substance or a non-ionic surfactant from the poly-glycoside family, and
the co-tenside comprises sodium caprylimino dipropionate.

18. The method according to claim 1, further comprising:
analyzing the used industrial oil to determine whether the at least one specific additive has been depleted in the used industrial oil; and
thereafter replenishing the used industrial oil with the at least one specific additive in an amount corresponding to a determined amount of depletion of the at least one specific additive.

19. The method according to claim 18, wherein the analyzing step comprises analyzing an amount of one or more of functional additives in the industrial oil to determine whether one or more predefined thresholds for the system or device is/are met.

20. The method according to claim 18, wherein the analyzing step further comprises:
analyzing the used industrial oil to identify an amount of contaminants in the used industrial oil, and
repeating the adding and separating steps in response to a determination that the identified amount of contaminations is above a predefined threshold.

21. An oil recovery system, comprising:
at least one oil purification tank holding a used industrial oil for purification;
a booster adding device connected to the oil purification tank and containing a liquid separation booster, the booster adding device being configured to add the liquid separation booster to the used industrial oil in the purification tank, wherein the separation booster attracts one or more impurities in the used industrial oil and does not attract at least one specific additive in the used industrial oil; and
a separation device configured to separate out the separation booster with attracted impurities from the used industrial oil while leaving the at least one specific additive in the used industrial oil;
wherein the separation booster comprises a polar polymer, a hydrotrope/solubilizer, and a co-tenside.

22. The oil recovery system according to claim 21, wherein:
the liquid separation booster is at least substantially insoluble in the used industrial oil and forms a two phase mixture upon mixing with the used industrial oil,
the separation booster attracts impurities in the used industrial oil during mixing of the used industrial oil and the separation booster,
the separation booster has a first polarity,
the at least one specific additive in the used industrial oil has a second polarity, and
the first polarity sufficiently differs from the second polarity such that the at least one specific additive is not soluble in the separation booster.

23. The oil recovery system according to claim 21, wherein the separation device comprises one or more of:
a mixing device for mixing the used industrial oil with the separation booster,
a heating device for warming a mixture of the used industrial oil and the separation booster,
a centrifuging device configured for centrifuging the mixture of the used industrial oil and the separation booster, and
a filtering device configured for filtering the mixture of the used industrial oil and the separation booster or for filtering an oil phase after the separation booster with attracted impurities has settled to a top or bottom phase.

24. The oil recovery system according to claim 21, further comprising:
at least one oil preparation tank configured for preparing the industrial oil,
wherein:
the separation booster is at least substantially insoluble in the used industrial oil and forms a two phase mixture upon mixing with the used industrial oil,
the separation booster attracts impurities in the used industrial oil during mixing of the used industrial oil and the separation booster,
the industrial oil comprises a mixture of base oils and the at least one specific additive, and
the mixture of the base oils and the at least one specific additive has a polarity that sufficiently differs from a polarity of the separation booster such that the base oils and the at least one specific additive are not soluble in the separation booster.

25. The oil recovery system according to claim 21, wherein the oil recovery system is designed as an inline system, so that the oil recovery system is integrable in a closed circuit circulation system of the industrial oil.

26. The oil recovery system according to claim 21, wherein the oil recovery system is provided as an offline system in which industrial oil from different industries can be reconditioned.

27. The oil recovery system production according to claim 24, further comprising:
at least one analyzing device configured to analyze the used industrial oil to determine whether the at least one specific additive has been depleted in the used industrial oil;
an additive supplying device containing the at least one specific additive and configured to replenish the used industrial oil with the at least one specific additive in an amount corresponding to a determined amount of depletion of the at least one specific additive;
at least one oil component tank connectable to the at least one oil preparation tank, wherein the at least one oil component tank comprises one or more base oil tanks containing one or more base oils; and
at least one used oil tank configured for holding the used industrial oil which has been returned to the oil recovery system after use in the specific system or specific type of system;
wherein:
the additive supplying device is connected to the at least one oil preparation tank and is configured to supply the at least one specific additive in an amount to meet required technical specifications for use in a specific system or type of system;
the at least one oil purification tank is connected to the at least one used oil tank;

the at least one analyzing device is further configured to determine whether one or ones of the one or more functional additives in a used industrial oil which has been returned to the oil recovery system has/have been depleted after use in the specific system or specific type of system; and the additive supplying device is further configured to add to the returned used industrial oil one or ones of the one or more functional additives which have been determined as being depleted in an amount corresponding to the amount of depletion determined by the at least one analyzing device.

28. The oil recovery system according to claim 27, wherein the at least one oil component tank comprises at least one oil concentrate tank containing a concentrated industrial oil that includes the one or more functional additives in an amount to meet required technical specifications for use in a specific system or type of system.

29. The oil recovery system according to claim 27, wherein the at least one oil purification tank comprises:
the booster adding device; and
a mixing device for mixing the returned used industrial oil with the separation booster.

30. The oil recovery system according to claim 27, wherein an outlet from the purification tank is connected to an inlet of at least one of the at least one oil preparation tanks through a filtering device.

31. The oil recovery system according to claim 21, wherein the at least one specific additive is selected from the group consisting of one or more of oxidation inhibitors, corrosion inhibitors, rust inhibitors, metal deactivators, anti-wear agents, extreme pressure agents, friction modifiers, detergents, dispersants, pour point depressants, viscosity index improvers, foam inhibitors, adhesion promotors, emulsifiers and bactericides.

32. The oil recovery system according to claim 27, wherein the at least one analyzing device is configured to analyze the removed used industrial oil to identify an amount of contaminants in the used industrial oil.

33. The oil recovery system according to claim 32, further comprising a return line fluidly connecting the at least one oil preparation tank to at least one additional oil purification tank such that the used industrial oil can be returned to the at least one oil purification tank for further purification in response to a determination that the identified amount of contaminants is above a predefined threshold.

* * * * *